G. V. CRING.
INSIDE WIND SHIELD FOR VEHICLES.
APPLICATION FILED SEPT. 30, 1915.
1,203,587.
Patented Nov. 7, 1916.
2 SHEETS—SHEET 1.
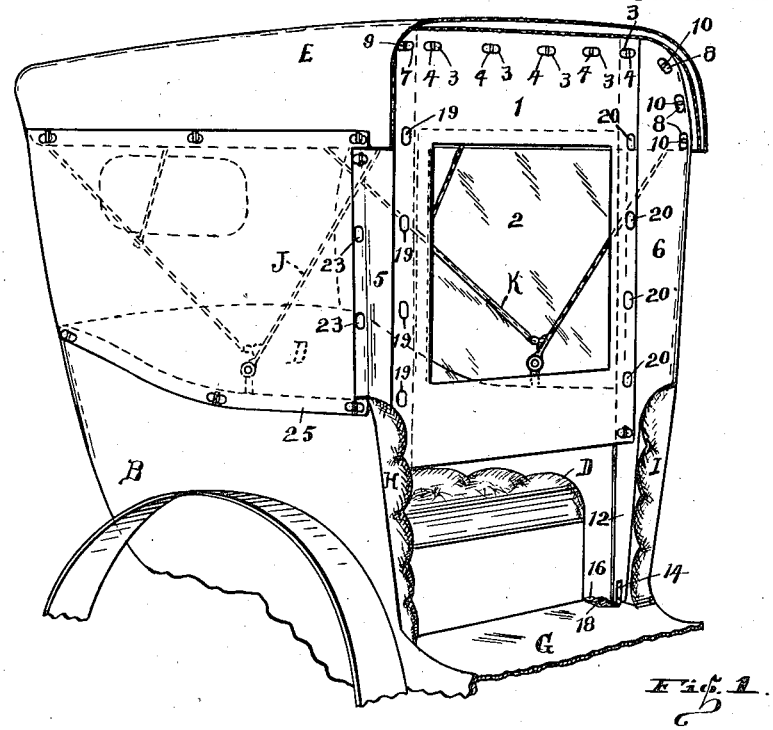
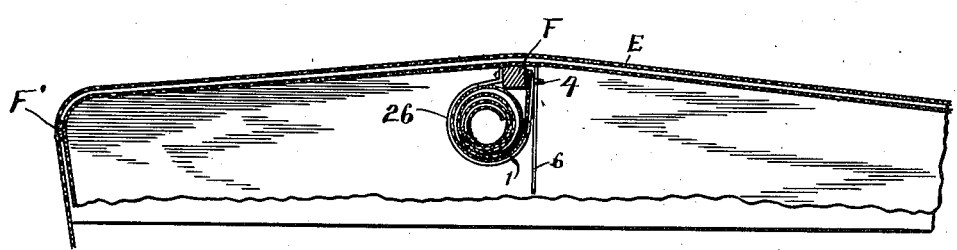
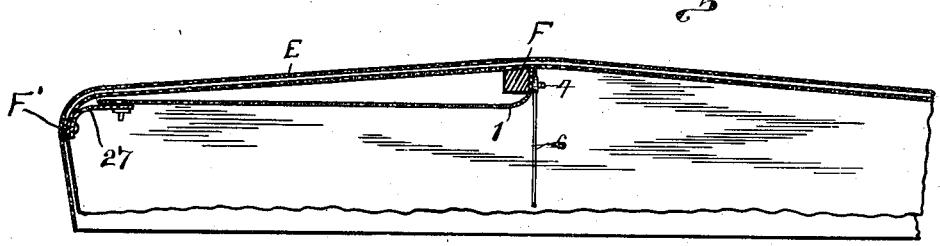
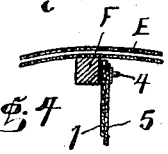
Witness:—
Adelaide Kearns,
Inventor:
George V. Cring;
By Robert H. Vandle
Attorney.

G. V. CRING.
INSIDE WIND SHIELD FOR VEHICLES.
APPLICATION FILED SEPT. 30, 1915.
1,203,587.
Patented Nov. 7, 1916.
2 SHEETS—SHEET 2.
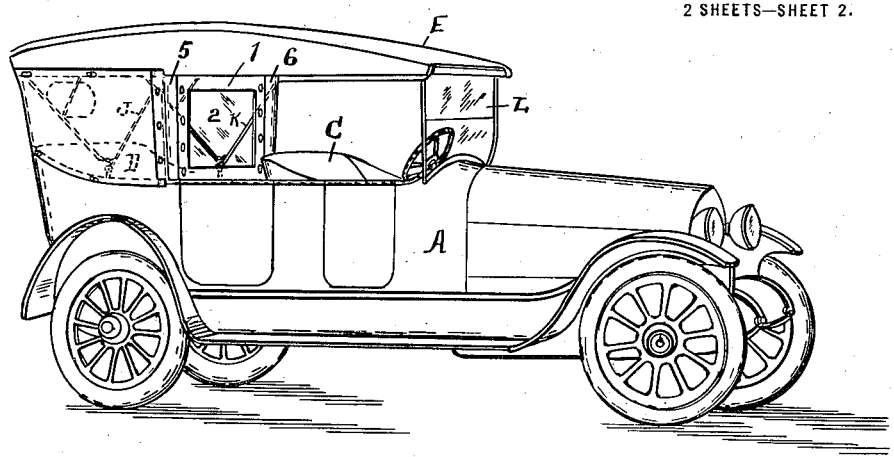
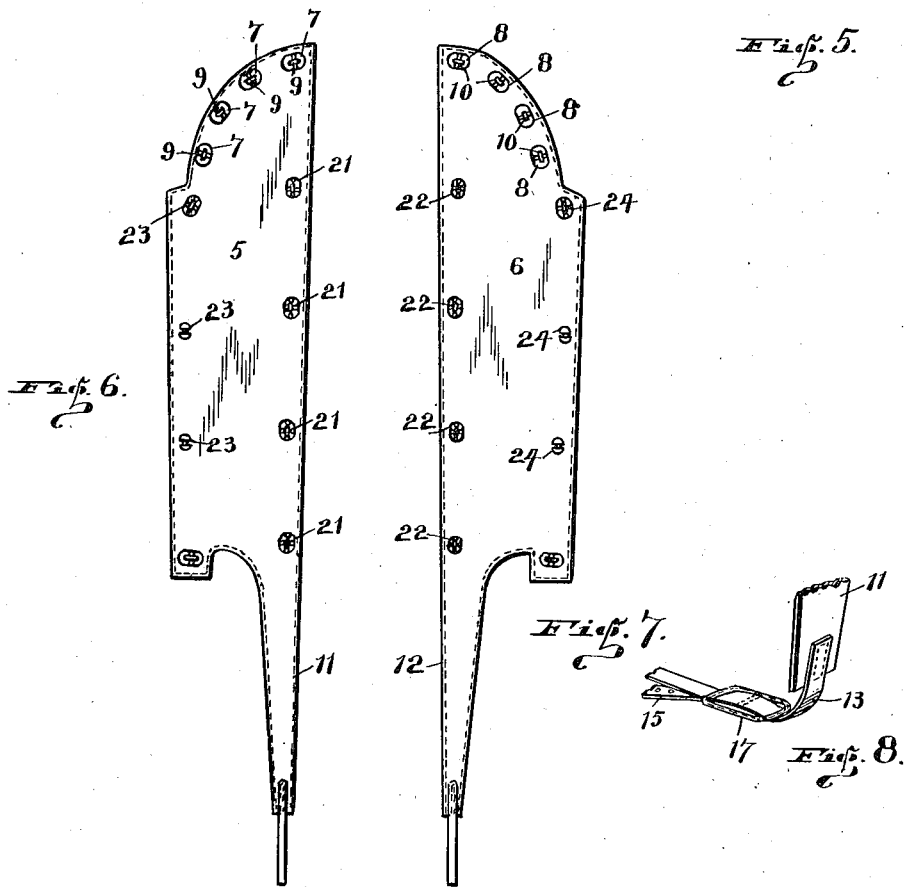

UNITED STATES PATENT OFFICE.

GEORGE V. CRING, OF PORTLAND, INDIANA.

INSIDE WIND-SHIELD FOR VEHICLES.

1,203,587. Specification of Letters Patent. Patented Nov. 7, 1916.

Application filed September 30, 1915. Serial No. 53,238.

*To all whom it may concern:*

Be it known that I, GEORGE V. CRING, a citizen of the United States, residing at Portland, in the county of Jay and State of Indiana, have invented a new and useful Inside Wind-Shield for Vehicles, of which the following is a full and accurate specification and exposition, being such as will enable others to make and use the same with exactitude.

In the operation of vehicles, such as an automobile, it is well known that the usual wind-shield protects, to a certain extent, the occupants on the front seat, but that very little protection is given thereby to the persons located on the rear seat. It is also desirable, many times, to protect the occupants on the rear seat from the wind while those on the front seat desire that the usual wind-shield be open and thereby obtain all of the wind possible.

To attain this desideratum is the primal object of my present invention, and thereby providing means for making the rear portion of the vehicle in the nature of a closed cab or the like, thereby enabling one with safety to transport an invalid or one who is susceptible to drafts of air.

A further object is to provide an inside wind-shield to protect the rear passengers of a vehicle and which will not interfere with a clear forward vision by such passengers; to provide a construction for this purpose which will be neat and attractive in appearance, strong and durable in construction, easily placed in and out of operative position, and when not in use will be entirely out of the way, or quickly disconnected from the vehicle when preferred, and which can be manufactured, sold, and installed at a comparatively low price.

Other minor objects and particular advantages of my invention will be brought out in the course of the following specification and that which is new will be correlated in the appended claims.

One manner of carrying out the principles of my invention in a practical way is shown in the accompanying two-sheets of drawings, in which—

Figure 1 is a perspective view of my invention in operative or closed position, in connection with the rear portion of a vehicle, which latter is shown in cross section. Fig. 2 is a longitudinal section of a portion of a vehicle top, showing the closure or main curtain rolled up out of operative position. Fig. 3 is a longitudinal section of a portion of a vehicle top, showing the closure or main curtain extending straight back with its free end secured in the rear. Fig. 4 is a section of a portion of the vehicle top, showing the manner of arranging the main curtain at its upper corners when it is to be turned back or rolled, as in Figs. 2 and 3. Fig. 5 is a perspective view of an automobile, showing the same equipped with my invention. Fig. 6 is a plan view of the right-hand jamb curtain. Fig. 7 is a plan view of the left-hand jamb curtain. And Fig. 8 is a detail perspective view of a buckle, with the securing straps, providing the means for detachably securing the lower ends of the jamb curtains.

Similar indices denote like parts throughout the several views.

In order that the construction, the advantages, and the operation of my invention may be better understood and appreciated, I will now take up a detailed description thereof, in which I will set forth the invention as comprehensively as I may.

Referring now to the drawings in detail: letter A denotes the forward portion of an automobile, and letter B denotes the rear portion thereof.

Letter C denotes the front seat and D the rear seat.

E denotes the top of the vehicle, the same having a plurality of cross-bows, as shown at F and F'.

Letter G denotes the floor; H and I denote the upholstering of the sides, between which the seat D is disposed.

J and K denote the swinging braces for the top, and L denotes the front wind-shield.

My invention proper comprises a main curtain 1, having secured therein a transparency 2.

Secured around near the upper edge of the curtain 1 are a plurality of slot-eyelets 3, and secured in the forward edge of the bow F are a plurality of pivot head fasteners 4, one for each of the eyelets 3, and through which they are adapted to be inserted and turned as in Fig. 1, to secure the curtain 1 in position.

The lower edge of the curtain 1 may hang down as far as desired, preferably substantially as shown in Fig. 1. From the above it will be seen that the curtain 1 is substantially square, as it does not extend out at the sides farther than to the curvature of the bow F, therefore in order to fill out to the width of the top I provide two jamb curtains, 5 and 6, whose upper edges are curved to fit the bow F and near the edges of said curved portions are the eyelets 7 and 8, respectively, which are adapted to fit over their respective pivot head fasteners 9 and 10. The jamb curtains extend down and fit over the tops of the upholstered sides H and I, and each has a tongue, 11 and 12 respectively, which extends down to near the floor G. Secured to and extending down from the lower end of each of the tongues 11 and 12 is a strap, 13 and 14 respectively. Secured to the floor G, or to other convenient places, are the two straps 15 and 16 which are adapted to extend up and overlap the respective straps 13 and 14. A buckle 17 is adapted to detachably connect the straps 13 and 15, also a buckle 18 is adapted to detachably connect the straps 14 and 16, all substantially as shown in Figs. 1 and 8.

The side edges of the curtain 1 should overlap the inner edges of the jamb curtains, as shown, and a plurality of rearwardly directed pivot head fastenings 19 are secured near the right-hand edge of the curtain 1, and also a plurality of rearwardly directed pivot head fastenings 20 are secured near the left-hand edge of the curtain 1. The fastenings 19 and 20 are adapted to be inserted and detachably secured in corresponding slot eyelets 21 and 22 respectively, located in the edge portions of the jamb curtains 5 and 6. It is evident that other kinds of fasteners may be employed, for instance, such as is commonly used on gloves.

Secured in the outer edge portions of each of the jamb curtains 5 and 6 are a plurality of pivot head fastenings 23 and 24, respectively, which are adapted to be secured in eyelets located in the forward edges of the usual side curtains, as the side curtain 25, shown in Fig. 1, however my invention may be used without the usual side curtains if desired.

In practice the fastenings 4 are permanently secured to the front edge of the bow F, and the straps 15 and 16, carrying the buckles 17 and 18, are secured to the floor, and with the exception of these parts all of the other features of the invention are detachable, and even they may be made detachable when desired. The jamb curtains 5 and 6 should first be secured in place, as shown, after which the main curtain 1 may be attached in place by means of the various fastenings specified. It is now evident that one of the edges of the main curtain 1 may be detached and the curtain 1 turned up to allow the passenger to enter and take his place on the seat D, after which the curtain 1 may be secured from either side of the curtain as desired, presumably by the person on the seat D.

Desiring to temporarily dispense with the curtain 1 one has only to detach it at the sides, from the jamb curtains, after which it may be rolled up, as in Fig. 2, and secured to the top by one or more straps or holders 26; or it may be swung back horizontally and secured at the rear by one or more straps or holders 27, as shown in Fig. 3.

As will be noticed in Fig. 1 the upper corners of the curtain 1 are secured on the same fastening as are the inner corners of the jamb curtains, and that the curtain 1 is on the outside or front of the jamb curtains, that is to say,—the curtain 1 is attached after the jamb curtains are attached, therefore in turning the curtain 1 back, as in Figs. 2 and 3, it may be desirable to reverse this order of attachment as to the upper corners of the curtain 1 with relation to the jamb curtains, that is to say,—unfasten the upper corners of the main curtain and the jamb curtains, then fasten the corners of main curtain, and finally fastening the corners of the jamb curtains over or in front of the main curtain, as shown in Fig. 4, thereby permitting the main curtain to extend back without its corner portions being stretched around the inner edges of the jamb curtains. It is evident that the jamb curtains alone will afford considerable protection.

From the above it is apparent that the interior of the rear portion of the vehicle may be entirely inclosed in order to protect the occupants and to enable the interior to be artificially heated if desired, and to give the appearance and results of a closed cab, and also means may be provided for ventilation.

I desire that it be understood that various changes may be made in the several details of construction and the arrangement of parts without departing from the spirit of my invention, and also that the principles of my invention may be employed in connection with various kinds and styles of vehicles, and that minor changes may be made in order to meet varying conditions.

Having now fully shown and described my invention, and the best manner for its construction to me known at this time, what I claim, and desire to secure by Letters Patent, is—

1. An inside wind-shield for vehicles, comprising a main curtain suspended from a central bow of the vehicle top and adapted to hang down inside the vehicle in the rear of the back of the front seat and in front of the rear seat and adapted to extend to near the floor of the vehicle, the same being of less width than the interior of the vehicle, a transparency in the said main curtain, jamb curtains located on each side of the main curtain and extending outward and rearward and adapted to be attached to the side curtains of the vehicle with their upper edges adapted to be secured to said bow and with their lower edges conforming with the contour of the upholstered sides of the rear seat and adapted to contact therewith, and each terminating in a tongue at its lower end which tongue extends down forward of the rear seat, means for detachably securing said tongues of the jamb curtains to the vehicle, and means for detachably connecting the jamb curtains to the main-curtain, all substantially as set forth.

2. An inside wind-shield comprising a main central curtain adapted to be suspended from the interior of the top of a vehicle and adapted to extend down back of the front seat and near the rear seat and being of less width than the interior of the vehicle, jamb curtains adapted to be attached to each side of the main curtain and extending outward and curved rearward to the side curtains of the vehicle to which they are adapted to be secured and extending down to near the floor of the vehicle, means for detachably connecting the lower ends of the jamb curtains to the body of the vehicle, and means whereby the main curtain may be secured out of operative position in the top of the vehicle, all substantially as shown and described.

In testimony whereof I have hereunto subscribed my name to this specification in the presence of two subscribing witnesses.

GEORGE V. CRING.

Witnesses:
   ADDA CRING,
   GRANT CHANEY.